United States Patent
Ikeda

(10) Patent No.: US 12,128,483 B2
(45) Date of Patent: Oct. 29, 2024

(54) CUTTING INSERT, CUTTING TOOL AND METHOD FOR MANUFACTURING MACHINED PRODUCT

(71) Applicant: KYOCERA CORPORATION, Kyoto (JP)

(72) Inventor: Yoshihito Ikeda, Ritto (JP)

(73) Assignee: KYOCERA CORPORATION, Kyoto (JP)

( * ) Notice: Subject to any disclaimer, the term of this patent is extended or adjusted under 35 U.S.C. 154(b) by 740 days.

(21) Appl. No.: 17/289,712

(22) PCT Filed: Oct. 28, 2019

(86) PCT No.: PCT/JP2019/042172
§ 371 (c)(1),
(2) Date: Apr. 28, 2021

(87) PCT Pub. No.: WO2020/090737
PCT Pub. Date: May 7, 2020

(65) Prior Publication Data
US 2022/0001455 A1 Jan. 6, 2022

(30) Foreign Application Priority Data
Oct. 29, 2018 (JP) .................. 2018-203068

(51) Int. Cl.
*B23B 27/14* (2006.01)
*B23B 1/00* (2006.01)
(Continued)

(52) U.S. Cl.
CPC .............. *B23B 27/14* (2013.01); *B23B 1/00* (2013.01); *B23B 2200/0433* (2013.01)

(58) Field of Classification Search
CPC .................. B23B 27/14; B23B 27/141; B23B 2200/0433; B23B 2200/328; B23B 1/00;
(Continued)

(56) References Cited

U.S. PATENT DOCUMENTS 6,655,881 B2 * 12/2003 Shimizu ................ B23B 27/145
407/113
7,524,148 B2 * 4/2009 Okita .................... B23B 27/143
407/115
(Continued)

FOREIGN PATENT DOCUMENTS

EP 349871 A * 1/1990 .......... B23B 27/145
JP H230407 A 1/1990
(Continued)

*Primary Examiner* — Sara Addisu
(74) *Attorney, Agent, or Firm* — HAUPTMAN HAM, LLP

(57) ABSTRACT

A cutting insert may include a first surface including a corner and a first side, a second surface, a third surface, an inclined surface located between the first surface and the third surface, a first ridgeline located on an intersection of the inclined surface and the first surface, and a second ridgeline located on an intersection of the inclined surface and the third surface. An imaginary straight line passing through a center of the first surface and a center of the second surface may be a central axis. In a cross section which is parallel to the central axis and is orthogonal to the first side, an imaginary straight line connecting the first ridgeline and the second ridge line may be a first straight line, and the inclined surface may include a first inclined surface located more away from the central axis than the first straight line.

17 Claims, 18 Drawing Sheets

(51) Int. Cl.
*B23B 27/22* (2006.01)
*B23C 5/10* (2006.01)

(58) Field of Classification Search
CPC ...... B23B 2200/3663; B23B 2226/125; B23B 2226/315
See application file for complete search history.

(56) References Cited

U.S. PATENT DOCUMENTS

| | | | |
|---|---|---|---|
| 10,160,083 B2 * | 12/2018 | Watanobe | B23B 27/18 |
| 10,245,644 B2 * | 4/2019 | Kukino | B24B 3/34 |
| 10,486,239 B2 * | 11/2019 | Sasaki | B23B 27/22 |
| 2002/0127068 A1 * | 9/2002 | Kinukawa | B23B 27/145 |
| | | | 407/113 |
| 2008/0025802 A1 * | 1/2008 | Kukino | B23B 27/145 |
| | | | 419/13 |
| 2008/0292415 A1 * | 11/2008 | Kuroda | B23B 27/145 |
| | | | 83/53 |
| 2015/0283617 A1 * | 10/2015 | Nagarajan | B23B 27/143 |
| | | | 407/114 |
| 2015/0321262 A1 | 11/2015 | Kondameedi et al. | |
| 2016/0214180 A1 * | 7/2016 | Sasaki | B23B 27/141 |
| 2017/0320143 A1 | 11/2017 | Lof | |
| 2020/0009664 A1 * | 1/2020 | Ikeda | B23B 27/22 |
| 2021/0069795 A1 * | 3/2021 | Kido | C23C 16/34 |
| 2023/0056761 A1 * | 2/2023 | Ikeda | B23B 1/00 |

FOREIGN PATENT DOCUMENTS

| | | |
|---|---|---|
| JP | H253302 U | 4/1990 |
| JP | H7185909 A | 7/1995 |
| JP | 2006159381 A | 6/2006 |
| JP | 2014117775 A | 6/2014 |
| JP | 2017530022 A | 10/2017 |
| JP | 201839101 A | 3/2018 |

* cited by examiner

US 12,128,483 B2

CUTTING INSERT, CUTTING TOOL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2019/042172 filed on Oct. 28, 2019, which claims priority to Japanese Application No. 2018-203068 filed on Oct. 29, 2018, which are entirely incorporated herein by reference.

TECHNICAL FIELD

The present disclosure may relate to a cutting insert, a cutting tool and a method for manufacturing a machined product. Specifically, the present disclosure may relate to a cutting insert including a hard material, such as cubic boron nitride (cBN) and polycrystalline diamond (PCD).

BACKGROUND

For example, a cutting tool may be discussed in Japanese Unexamined Patent Publication No. 2018-39101 (Patent Document 1) and may be used as a cutting tool for use in a cutting process of a workpiece, such as high hardness materials. The cutting tool discussed in Patent Document 1 may include a honing surface formed on an intersecting ridgeline portion of a rake surface and a flank surface.

There has been a desire to further improve chip discharge performance.

SUMMARY

A cutting insert in a non-limiting aspect of the present disclosure may include a first surface including a corner and a first side extended from the corner, a second surface located on a side opposite to the first surface, a third surface located between the first surface and the second surface, an inclined surface located between the first surface and the third surface, a first ridgeline located on an intersection of the inclined surface and the first surface, and a second ridgeline located on an intersection of the inclined surface and the third surface. An imaginary straight line passing through a center of the first surface and a center of the second surface may be a central axis. In a cross section which is parallel to the central axis and is orthogonal to the first side in a front view of the first surface, an imaginary straight line connecting the first ridgeline and the second ridge line may be a first straight line, and the inclined surface may include a first inclined surface located more away from the central axis than the first straight line.

EMBODIMENTS

<Cutting Inserts>

Figure 1:
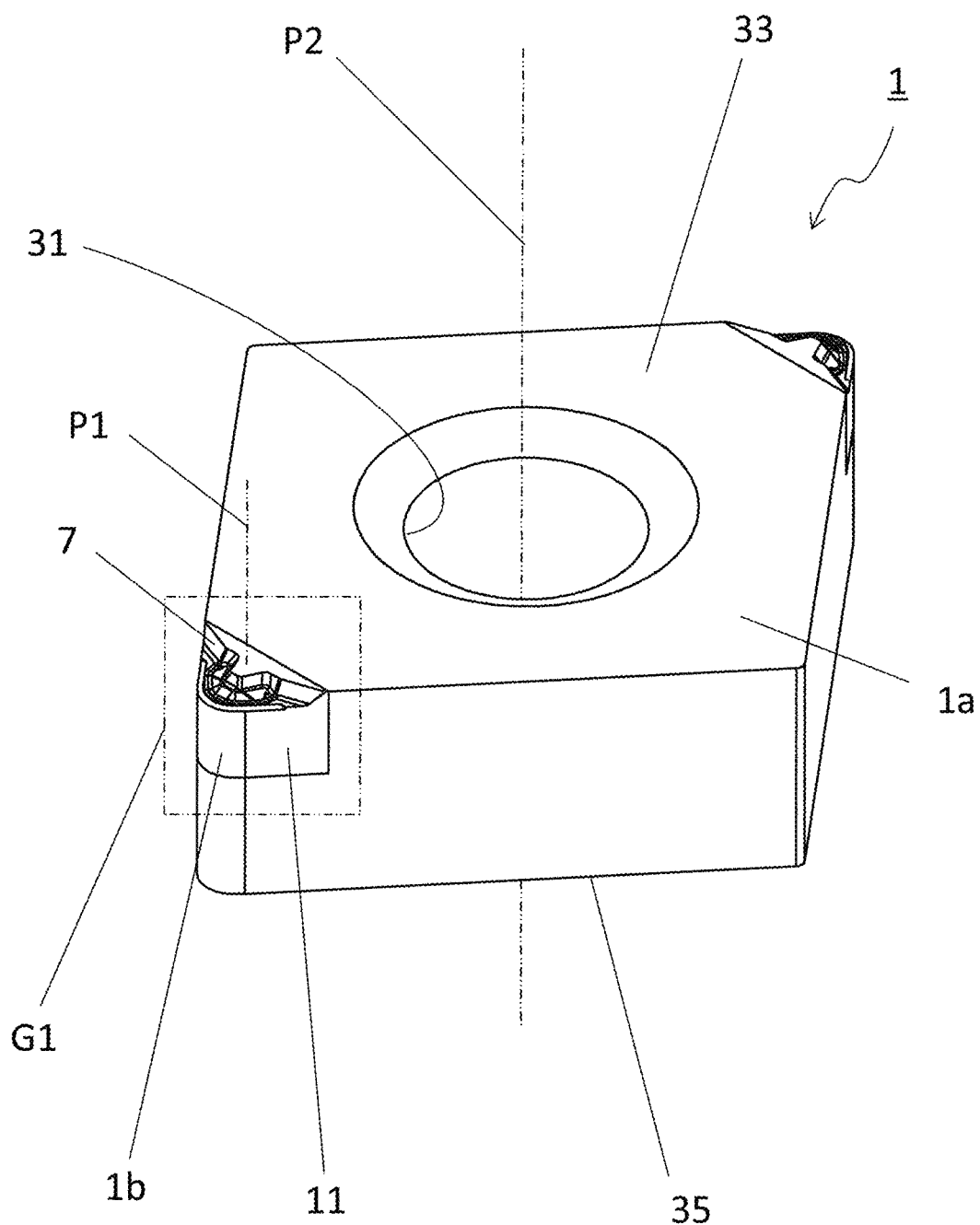
FIG. 1 is a perspective view illustrating a cutting insert in a non-limiting aspect of the present disclosure.

Cutting inserts 1 (hereinafter also referred to simply as "inserts 1") in various embodiments of the present disclosure may be described in detail below with reference to the drawings. For the sake of description, the drawings referred to in the following may illustrate, in simplified form, only main members necessary for describing the embodiments. The following inserts 1 of the present disclosure may therefore be capable of including any arbitrary structural member not illustrated in the drawings referred to. Dimensions of the members in each of the drawings faithfully represent neither dimensions of actual structural members nor dimensional ratios of these members.

The insert 1 may include a base body 1*a* and a cutting part 1*b* as illustrated in FIG. 1. The cutting part 1*b* may be joined to the base body 1*a*, and may be a sintered body including at least one of cubic boron nitride (cBN) and diamond.

The insert 1 may have a polygonal plate shape as a whole. The insert 1 may have, for example, an approximately quadrangular plate shape as in the embodiment illustrated in FIG. 1. The base body 1*a* may have an approximately polygonal plate shape whose corners are partially cut. The base body 1*a* may have an approximately quadrangular plate shape whose corners are partially cut out in the embodiment illustrated in FIG. 1. The cutting part 1*b* may be joined to the cut-out parts by using, for example, a brazing material. The cutting part 1*b* may have an approximately triangular plate shape as in the embodiment illustrated in FIG. 1.

The base body 1*a* and the cutting part 1*b* are not limited to the above configuration. For example, the base body 1*a* and the cutting part 1*b* may have the quadrangular plate shape and may have the same shape in a plan view. The cutting part 1*b* having the quadrangular plate shape may be located on the base body 1*a* having the quadrangular plate shape.

The cutting part 1*b* may include a first surface 7, a second surface 9 located on a side opposite to the first surface 7, and a third surface 11 located between the first surface 7 and the second surface 9. The first surface 7 may include a corner 3 and a first side (first line) 5 extended from the corner 3 as in an embodiment illustrated in FIG. 2. A part of the second surface 9 and a part of the third surface 11 in the cutting part 1b may be joined to the base body 1a as in the embodiment illustrated in FIG. 2.

Figure 2:
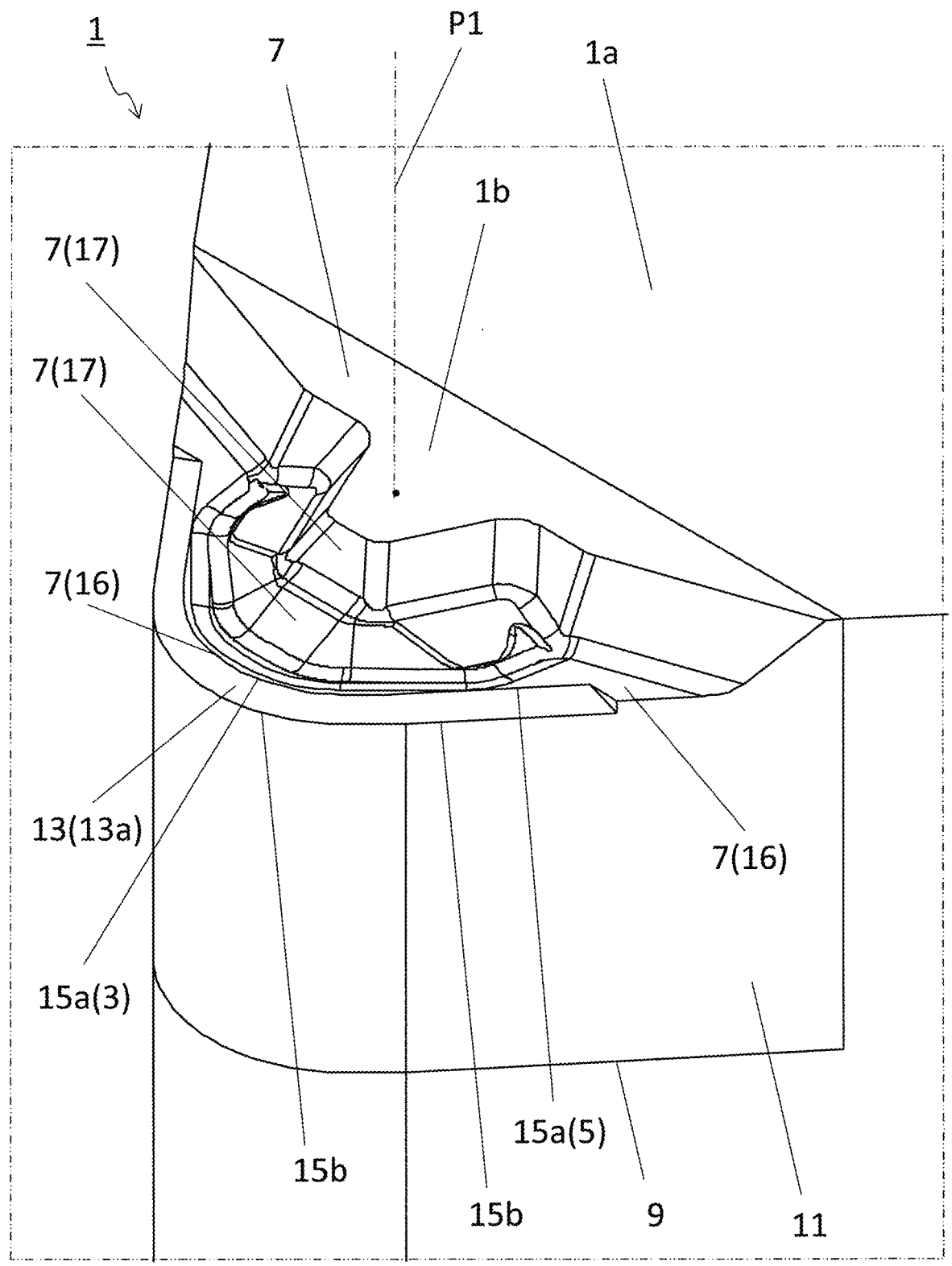
FIG. 2 is an enlarged view illustrating a region G1 in FIG. 1.
Figure 3:
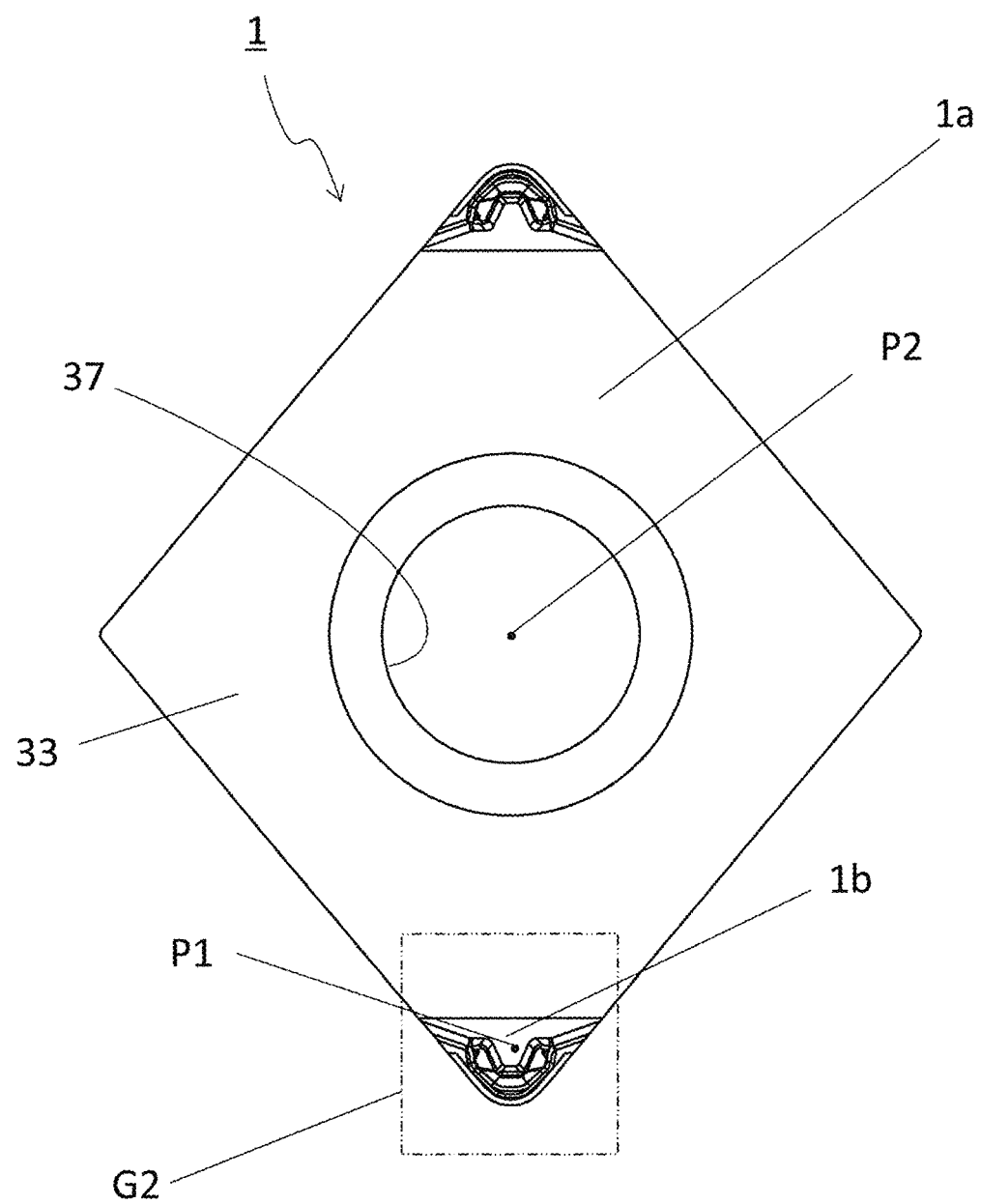
FIG. 3 is a top view of the cutting insert illustrated in FIG. 1.

The first surface 7 may be located at an upper part of the cutting part 1b as in the embodiment illustrated in FIG. 2. For the sake of convenience, the first surface 7 may be rephrased as the upper surface 7. The second surface 9 may be located at a lower part of the cutting part 1b as in the embodiment illustrated in FIG. 2. For the sake of convenience, the second surface 9 may be rephrased as the lower surface 9. The third surface 11 may be located between the upper surface 7 and the lower surface 9, and may connect to each of these surfaces as in the embodiment illustrated in FIG. 2. For the sake of convenience, the third surface 11 may be rephrased as the first lateral surface 11.

Figure 4:
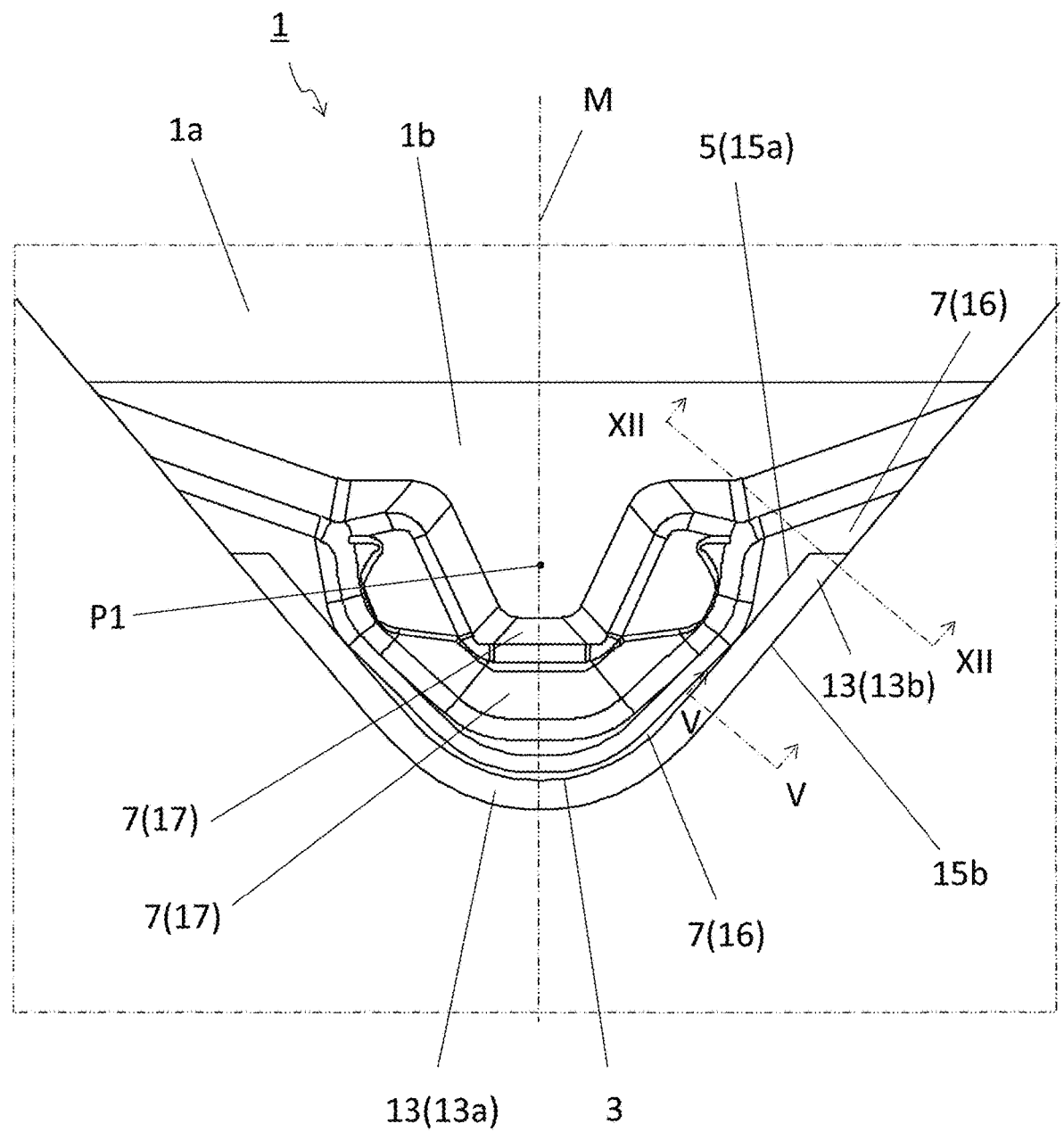
FIG. 4 is an enlarged view illustrating a region G2 in FIG. 3.

The upper surface 7 may have a polygonal shape, and the upper surface 7 may have a triangular shape as in an embodiment illustrated in FIG. 4. For example, the upper surface 7 may include three corners and three sides as in the embodiment illustrated in FIG. 4. If the upper surface 7 has the triangular shape, the first lateral surface 11 may be formed by three surface regions. The shape of the upper surface 7 is not limited to a configuration illustrated in FIG. 4. There is no problem even if the upper surface 7 has, for example, a quadrangular shape, pentagonal shape, hexagonal shape or octagonal shape.

The corner 3 may be one of the three corners of the upper surface 7, and the first side 5 may be one of the three sides of the upper surface 7 in FIG. 4.

The upper surface 7 may have an approximately polygonal shape and is not limited to a strict polygonal shape. That is, the sides of the upper surface 7 having the polygonal shape may have, for example, a slightly curved convex curvilinear shape or concave curvilinear shape without being limited to a strict straight line shape. The corners of the upper surface 7 having the polygonal shape may have, for example, a shape being rounded outward without being limited to a configuration obtained by intersection of two straight lines.

The first side 5 may have a straight line shape in a top view as in the embodiment illustrated in FIG. 4. The corner 3 may have a convex curvilinear shape. Alternatively, the corner 3 may have a circular arc shape whose radius of curvature is kept constant, or may be formed by a plurality of portions that are different in radius of curvature.

The cutting part 1b may include an inclined surface 13 located between the upper surface 7 and the first lateral surface 11 as in the embodiment illustrated in FIG. 2. The inclined surface 13 may be inclined relative to the upper surface 7 and the first lateral surface 11. The inclined surface 13 may also be inclined relative to the upper surface 7 and the first lateral surface 11 in FIGS. 5 to 8 and 10.

If an imaginary straight line passing through a center (center of gravity) of the upper surface 7 and a center (center of gravity) of the lower surface 9 is a central axis P1 in FIG. 2, the inclined surface 13 may be inclined relative to the central axis P1. The inclined surface 13 may also be inclined relative to the central axis P1 in FIGS. 5 to 8 and 12.

The inclined surface 13 may be located along the corner 3 and the first side 5 as in the embodiment illustrated in FIG. 2. Hereinafter, a ridgeline located on an intersection of the inclined surface 13 and the upper surface 7 may be a first ridgeline 15a. The inclined surface 13 may be in contact with the corner 3 and the first side 5. Thus, the cutting part 1b may include the first ridgeline 15a located on the intersection of the inclined surface 13 and the upper surface 7.

The cutting part 1b may include a second ridgeline 15b located on an intersection of the inclined surface 13 and the first lateral surface 11 as illustrated in FIG. 2. The second ridgeline 15b may be approximately parallel to the first ridgeline 15a.

Although dimensions of the cutting part 1b are not particularly limited, a length of the first side 5 of the upper surface 7 may be set to, for example, approximately 0.2-2 mm. A height from the upper surface 7 to the lower surface 9 may be set to approximately 2-8 mm.

The insert 1 may have line symmetry with reference to a bisector M of the corner 3 as illustrated in FIG. 4. If the insert 1 has the line symmetry, the insert 1 may be used for right-handed and left-handed cutting processes.

The insert 1 may include a cutting edge located on at least a part of the second ridgeline 15b. The cutting edge may be used to cut out a workpiece. If the cutting edge is located on at least the part of the second ridgeline 15b, the inclined surface 13 may serve as a so-called land surface.

The upper surface 7 may include a rake surface 16 and a breaker surface 17 in the present disclosure as illustrated in FIGS. 2 and 4. The rake surface 16 may be located along the corner 3 and the first side 5. The rake surface 16 may be a curved surface or flat surface. Hereinafter, an imaginary flat surface which is orthogonal to the central axis P1 and is located between the upper surface 7 and the lower surface 9 may be a reference plane S. The rake surface 16 may be parallel to the reference plane S.

The rake surface 16 may be inclined upward as coming inward from the corner 3 and the first side 5. As used herein, the term "inclined upward" may denote that the rake surface 16 is located more away from the reference plane S as going away from the corner 3 and the first side 5. Alternatively, the rake surface 16 may be inclined downward as coming inward from the corner 3 and the first side 5. As used herein, the term "inclined downward" may denote that the rake surface 16 is located closer to the reference plane S as going away from the corner 3 and the first side 5.

The breaker surface 17 may be located more away from the corner 3 and the first side 5 than the rake surface 16 as in FIGS. 2 and 4. The breaker surface 17 may be inclined upward as coming inward from the corner 3 and the first side 5. As used herein, the term "inclined upward" may denote that the breaker surface 17 is located more away from the reference plane S as going away from the corner 3 and the first side 5.

Alternatively, the breaker surface 17 may be inclined downward as coming inward from the corner 3 and the first side 5. As used herein, the term "inclined downward" may denote that the breaker surface 17 is located closer to the reference plane S as going away from the corner 3 and the first side 5.

Figure 5:
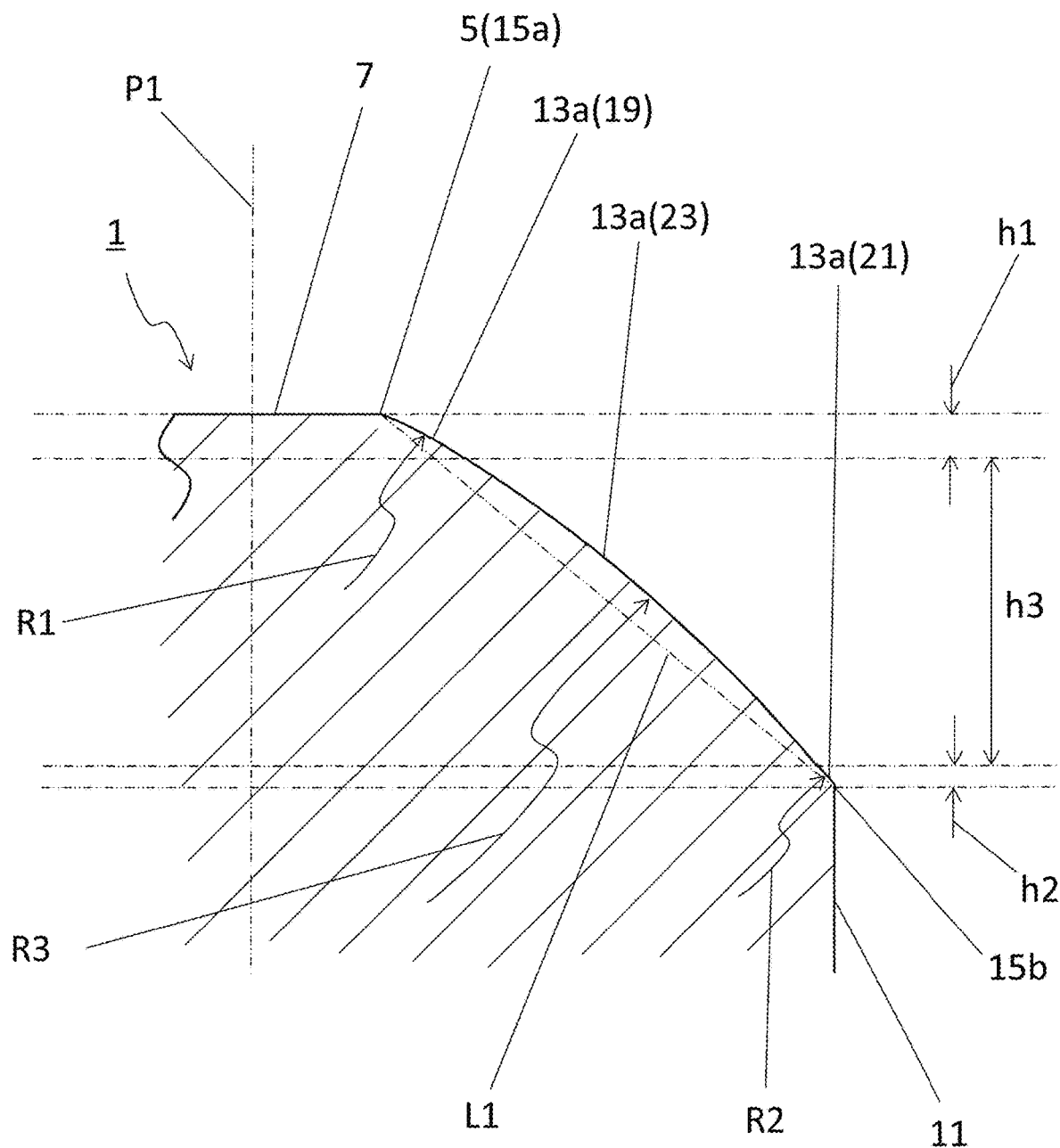
FIG. 5 is a sectional view taken along line V-V in FIG. 4.

FIG. 5 may be a diagram illustrating a cross section which is parallel to the central axis P1 and is orthogonal to the first side 5 in a front view of the upper surface 7. A first straight line L1 that is an imaginary straight line connecting the first side 5 and the second ridgeline 15b may be set in the above cross section. The inclined surface 13 may include a first inclined surface 13a located more away from the central axis P1 than the first straight line L1.

The inclined surface 13 may strictly intersect with the first straight line L1 on the first side 5 and the second ridgeline 15b. The first inclined surface 13a may be therefore located away from the first side 5 and the second ridgeline 15b.

If the first inclined surface 13a is located more away from the central axis P1 than the first straight line L1, it may be easy to ensure a thickness of the first inclined surface 13a. This may lead to enhanced durability of the insert 1.

The first inclined surface 13a may be formed by a plurality of straight line portions.

The first inclined surface 13a may be a curved line as in an embodiment illustrated in FIG. 5. If the first inclined surface 13a is the curved line, resistance exerted on the first inclined surface 13a may tend to decrease during a cutting process. Consequently, the insert 1 may have enhanced cutting performance.

Alternatively, the first inclined surface 13a may be formed by a plurality of straight line portions and a plurality of curved line portions. Still alternatively, the first inclined surface 13a may be a curved line whose radius of curvature is kept constant, or may be formed by a plurality of curved line portions that are different in radius of curvature.

The first inclined surface 13a may include a first portion 19, a second portion 21 and a third portion 23 as in the embodiment illustrated in FIG. 5. The first portion 19 may be located close to the first ridgeline 15a. In other words, the first portion 19 may be adjacent to the first ridgeline 15a. The second portion 21 may be located close to the second ridgeline 15b. In other words, the second portion 21 may be adjacent to the second ridgeline 15b. The third portion 23 may be located between the first portion 19 and the second portion 21.

A radius of curvature of the first portion 19 may be a first radius of curvature R1, a radius of curvature of the second portion 21 may be a second radius of curvature R2, and a radius of curvature of the third portion 23 may be a third radius of curvature R3. The third radius of curvature R3 may be larger than each of the first radius of curvature R1 and the second radius of curvature R2. In other words, each of the first radius of curvature R1 and the second radius of curvature R2 may be smaller than the third radius of curvature R3.

If the first inclined surface 13a includes the above configuration, a contact area between the insert 1 and the workpiece may tend to decrease during the cutting process. This may contribute to reducing resistance during the cutting process, thus leading to high machining accuracy of the insert 1.

Although values of the first radius of curvature R1, the second radius of curvature R2 and the third radius of curvature R3 are not particularly limited, R3 may be settable to a value expressed by a relationship of 5R1 to 10R1. R3 may be settable to dimensions expressed by a relationship of 20R2 to 33R2. Specifically, for example, R1 may be settable to values of 20-50 mm, R2 may be settable to values of 5-15 mm and R3 may be settable to values of 100-500 mm.

Figure 6:
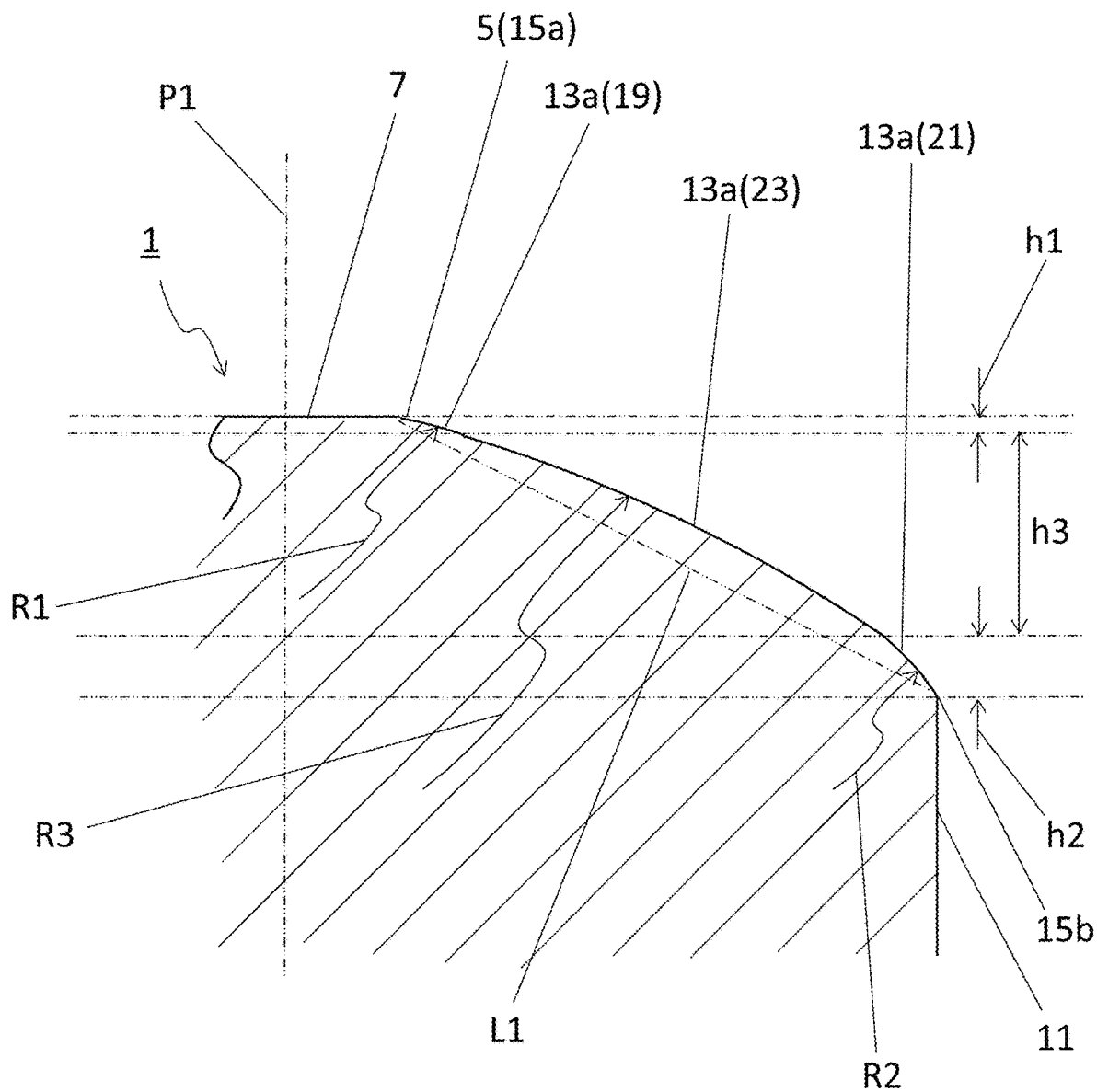
FIG. 6 is a sectional view of a cutting insert in a non-limiting aspect of the present disclosure.
Figure 7:
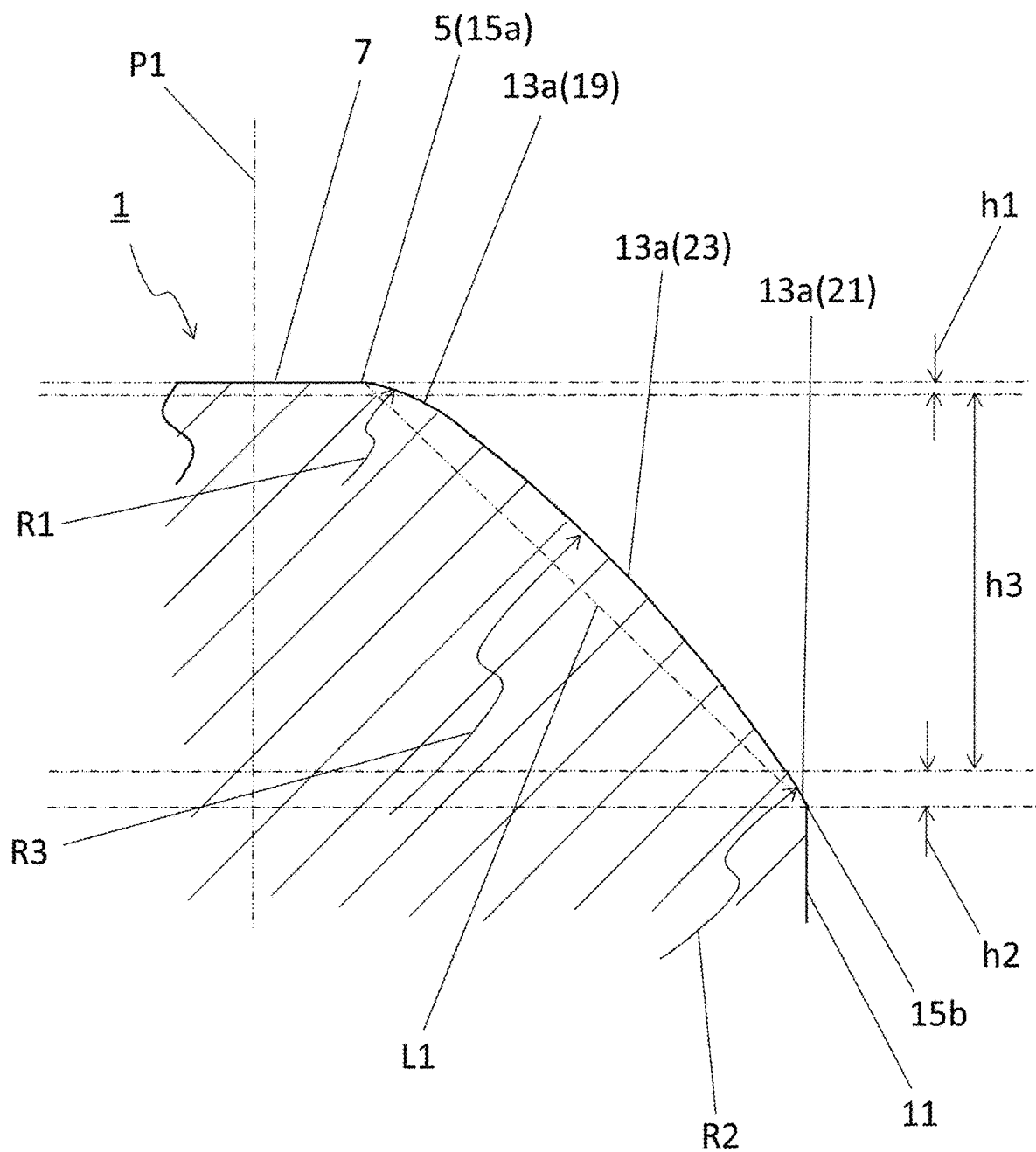
FIG. 7 is a sectional view of a cutting insert in a non-limiting aspect of the present disclosure.
Figure 8:
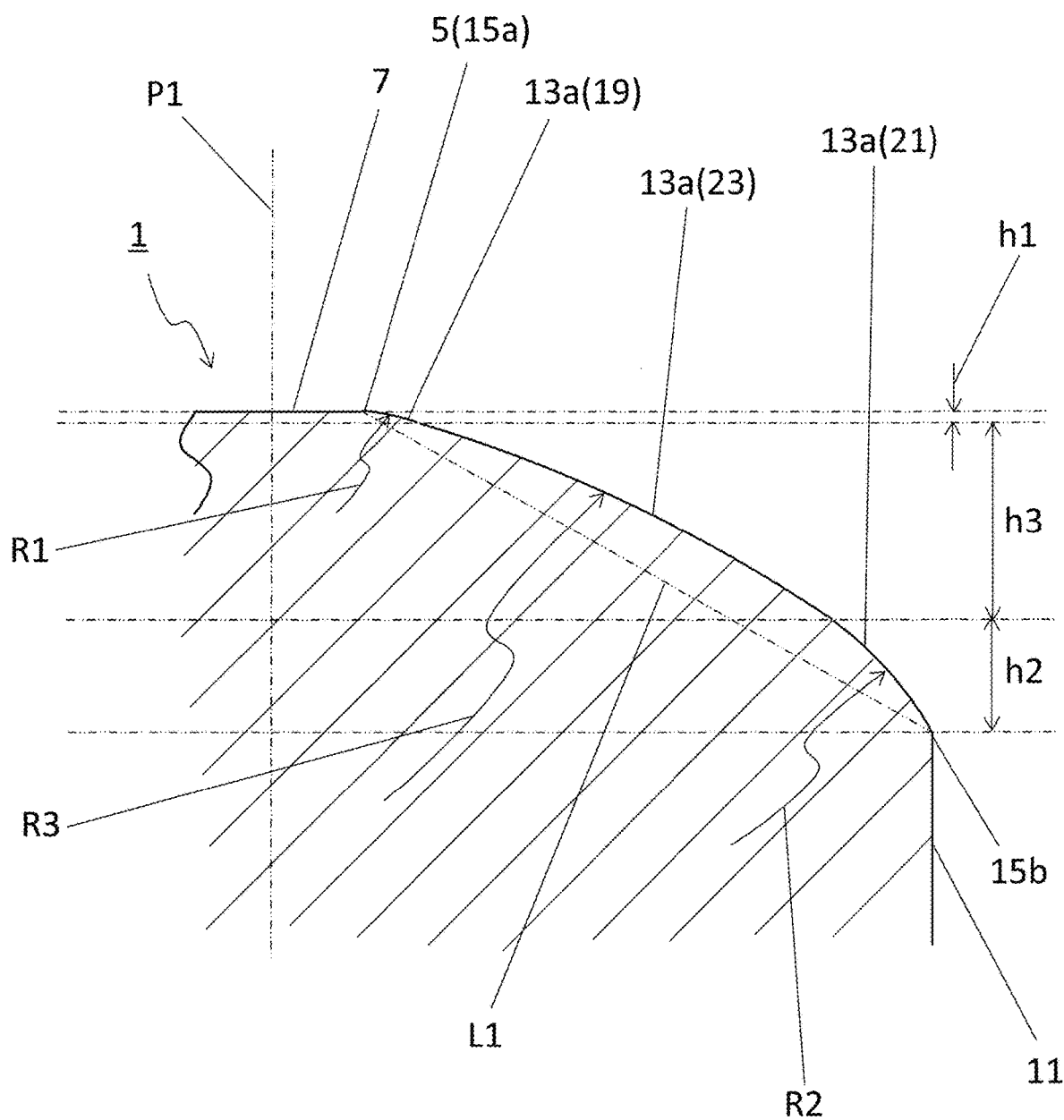
FIG. 8 is a sectional view of a cutting insert in a non-limiting aspect of the present disclosure.

The first radius of curvature R1 may be larger than the second radius of curvature R2 as in an embodiment illustrated in FIGS. 5 and 6. FIG. 6 may be a cross section corresponding to FIG. 5 in the insert 1 in an embodiment. If the first inclined surface 13a includes the above configuration, the cutting edge 5 may be less susceptible to fracture during the cutting process, and resistance exerted on the second ridgeline 15b may tend to decrease. The second radius of curvature R2 may be larger than the first radius of curvature R1 as in an embodiment illustrated in FIGS. 7 and 8. FIGS. 7 and 8 may be cross sections corresponding to FIG. 5 in the insert 1 of an embodiment.

If the first inclined surface 13a includes the above configuration, the second ridgeline 15b may be less susceptible to chipping and resistance exerted on the cutting edge 5 may tend to decrease during the cutting process.

As illustrated in FIG. 5, a distance between the first ridgeline 15a and an end portion of the first portion 19 which is located on a side of the lower surface 9 in a direction along the central axis P1 may be a first distance h1, a distance between an end portion of the second portion 21 which is located on a side of the upper surface 7 and the second ridgeline 15b in the direction along the central axis P1 may be a second distance h2, and a distance between an end portion of the third portion 23 which is located on a side of the upper surface 7 and an end portion thereof which is located on a side of the lower surface 9 in the direction along the central axis P1 may be a third distance h3. The third distance h3 may be larger than each of the first distance h1 and the second distance h2.

If the first inclined surface 13a includes the above configuration, the first inclined surface 13a may have enhanced durability.

The first distance h1 may be larger than the second distance h2 as in the embodiment illustrated in FIGS. 5 and 7. Chips may flow from the third portion 23 toward the first portion 19 in the cutting process. If the first distance h1 is larger than the second distance h2, the first inclined surface 13a may be less susceptible to shape variation in a range from the third portion 23 to the first portion 19. This may contribute to improving chip discharge.

If the second distance h2 is relatively small, a contact area with the workpiece may tend to decrease. Accordingly, resistance exerted on the second portion 21 may tend to decrease in the cutting process.

Alternatively, the second distance h2 may be larger than the first distance h1 as in the embodiment illustrated in FIGS. 6 and 8. If the first inclined surface 13a includes the above configuration, the second ridgeline 15b may be less susceptible to chipping during the cutting process.

Figure 9:
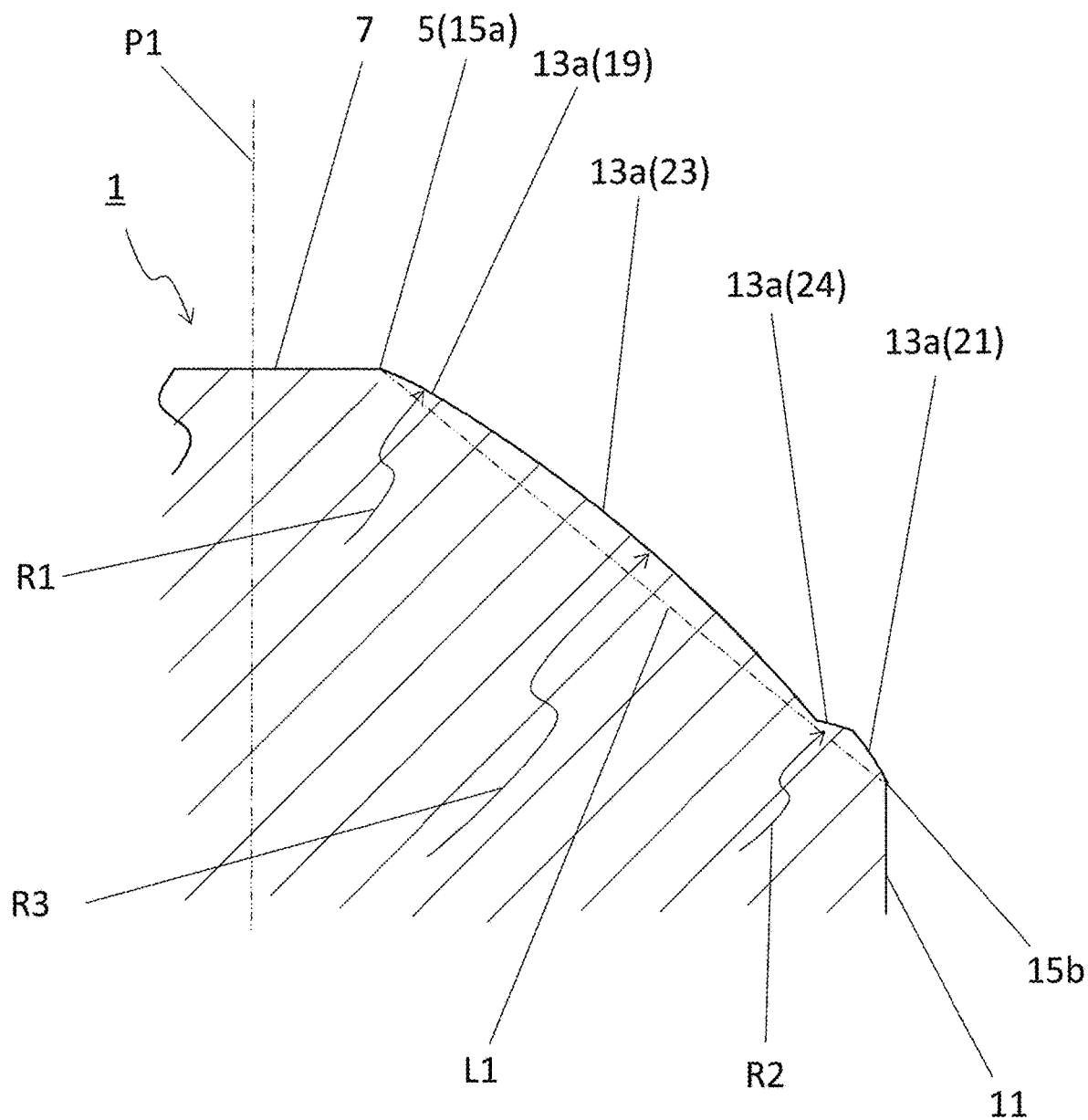
FIG. 9 is a sectional view of a cutting insert in a non-limiting aspect of the present disclosure.
Figure 10:
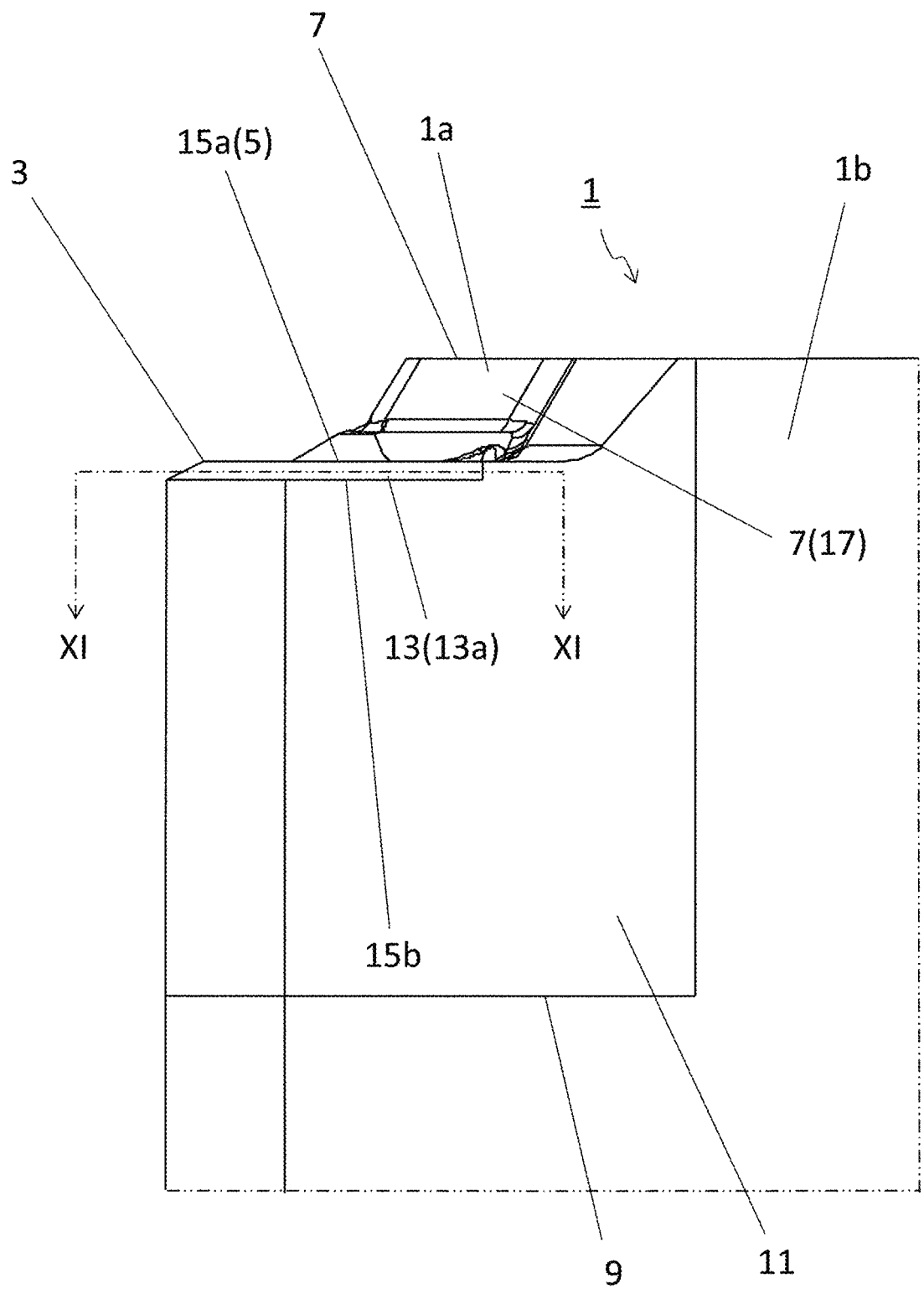
FIG. 10 is an enlarged view of a lateral surface of a cutting insert in a non-limiting aspect of the present disclosure.

The first inclined surface 13a may further include a fourth portion 24 located between the second portion 21 and the third portion 23 as in an embodiment illustrated in FIG. 9.

Figure 11:
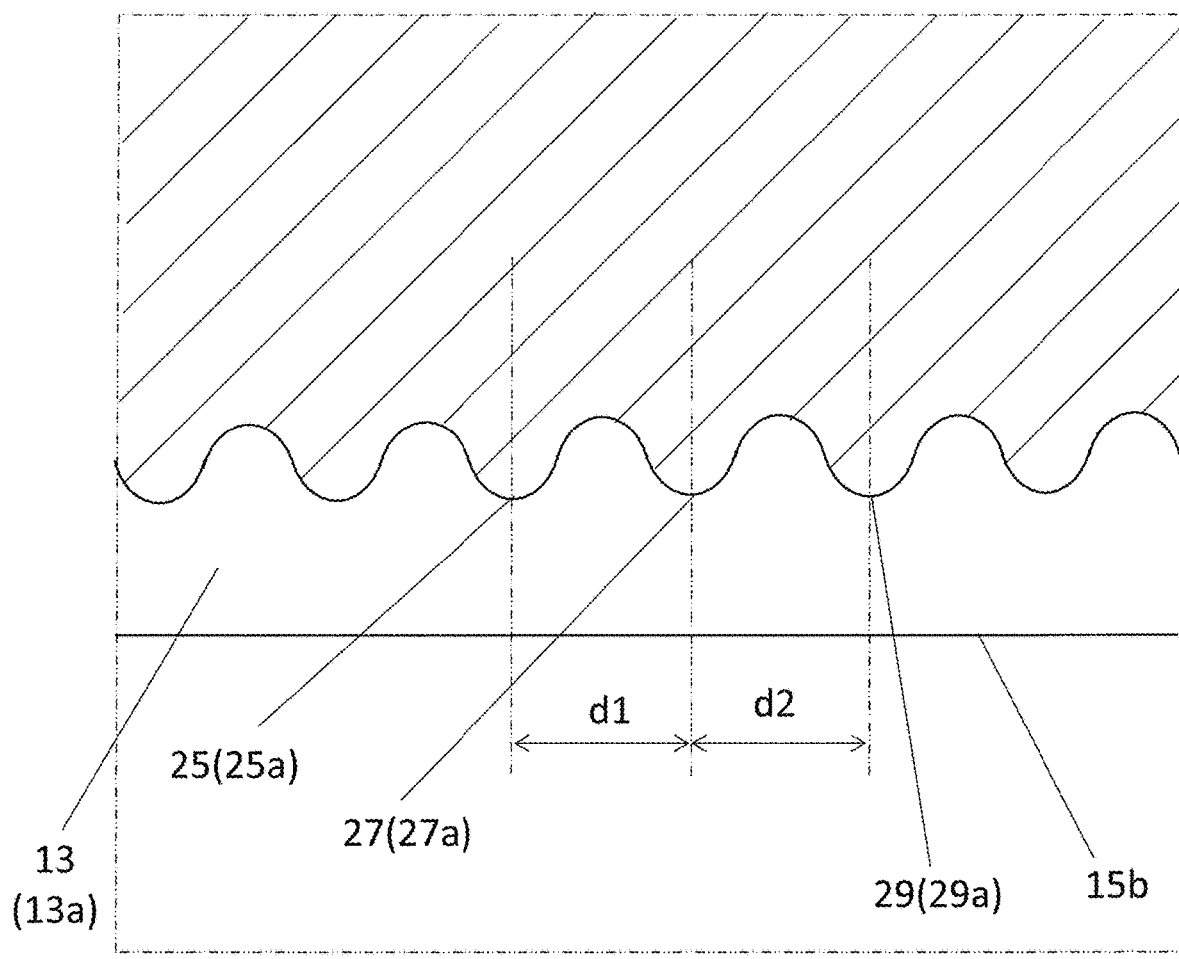
FIG. 11 is a sectional view taken along line XI-XI in FIG. 10.

FIG. 11 may be a cross section that intersects with the first inclined surface 13a and is orthogonal to the central axis P1. The first inclined surface 13a may include a first convex curved line 25, a second convex curved line 27 and a third convex curved line 29 in the cross section. The second convex curved line 27 may be located adjacent to the first convex curved line 25. The third convex curved line 29 may be located adjacent to the second convex curved line 27.

Hereinafter, a distance between a top portion 25a of the first convex curved line 25 and a top portion 27a of the second convex curved line 27 may be a distance d1, and a distance between the top portion 27a of the second convex curved line 27 and a top portion 29a of the third convex curved line 29 may be a distance d2. The distance d1 may be equal to the distance d2.

If the first inclined surface 13a includes the above configuration, a coolant may tend to be supplied to a wide range of the first inclined surface 13a in a cutting process using the coolant. Additionally, if the first inclined surface 13a includes the above configuration, the first inclined surface 13a may include periodic concave and convex portions. Therefore, chips may tend to be more suitably discharged than cases where the first inclined surface 13a includes non-periodic concave and convex portions.

Alternatively, d1 may not strictly be equal to d2. For example, d1 and d2 may be 0.5-10 μm.

The inclined surface 13 may further include a second inclined surface 13b located more away from the corner 3 than the first inclined surface 13a as in the embodiment illustrated in FIGS. 2 and 4. The second inclined surface 13b may connect to the first inclined surface 13a.

Figure 12:
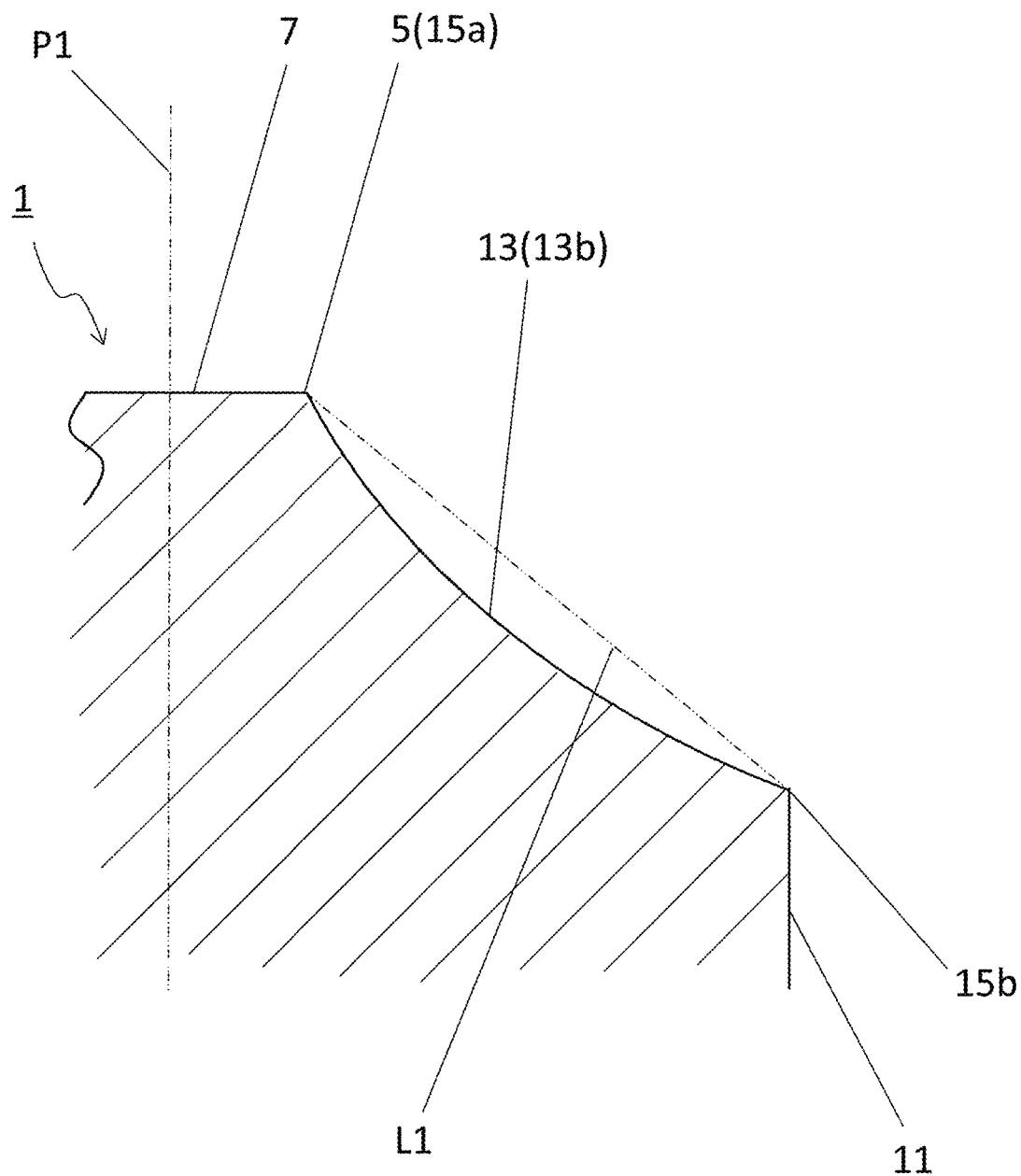
FIG. 12 is a sectional view taken along line XII-XII in FIG. 4.

FIG. 12 may be a cross section which is parallel to the central axis P1, and which is orthogonal to the first side 5 and passes through the second inclined surface 13b in the front view of the upper surface 7. The second inclined surface 13b may be located closer to the central axis P1 than the first straight line L1 in the cross section. The second inclined surface 13b may intersect with the first ridgeline 15a and the second ridgeline 15b in the embodiment illustrated in FIG. 12. Strictly speaking, except for these intersections, the second inclined surface 13b may be located closer to the central axis P1 than the first straight line L1.

If the second inclined surface 13b includes the above configuration, it may be easy to ensure a chip discharge space on the inclined surface 13. The insert 1 may therefore have enhanced chip discharge performance.

The base body 1a may include an upper end surface 33 as in the embodiment illustrated in FIG. 1. The base body 1a may include a lower end surface 35 located on a side opposite to the upper end surface 33. The base body 1a may include a second lateral surface 36 located between the upper end surface 33 and the lower end surface 35.

The insert 1 may include a hole 37 that opens into the upper end surface 33. The hole 37 may be extended through the lower end surface 35. The hole 37 is not limited to one which has the above configuration. For example, the hole 37 may open into the second lateral surface 36 of the insert 1, and may be extended from one of flat surface regions constituting the second lateral surface 36 of the insert 1 to another surface region located on a side opposite to the above surface region. The central axis P2 of the hole 37 may be indicated by a two-dot chain line in FIG. 1. The central axis P2 of the hole 37 may be parallel to the central axis P1 of the cutting part 1b as in the embodiment illustrated in FIG. 1.

The hole 37 may be usable as an insertion hole for a fixing tool if attaching the insert 1 to a holder. Examples of the fixing tool may include a screw, a clamping member and a wedge.

Figure 13:
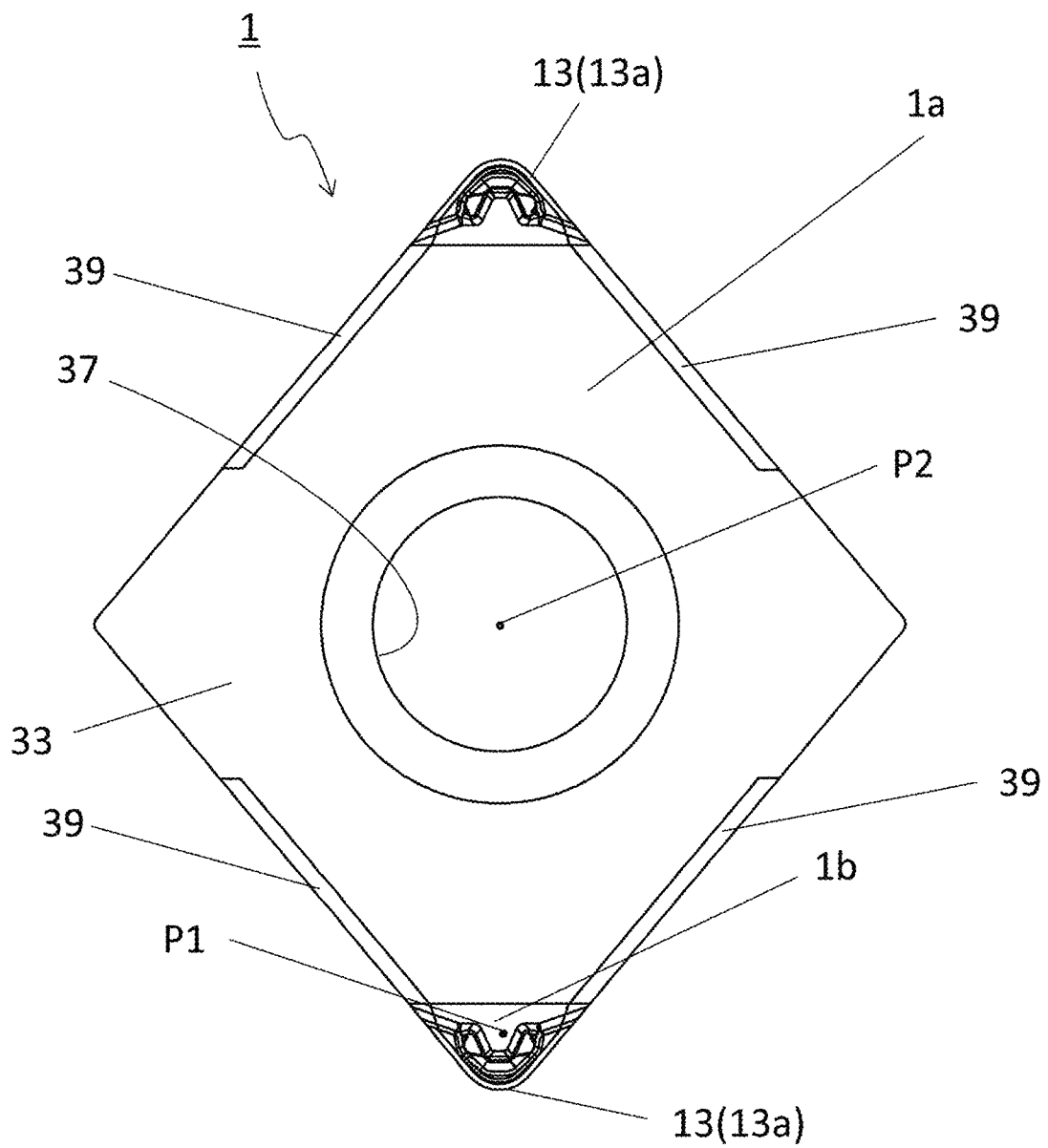
FIG. 13 is a top view of a cutting insert in a non-limiting aspect of the present disclosure.
Figure 14:
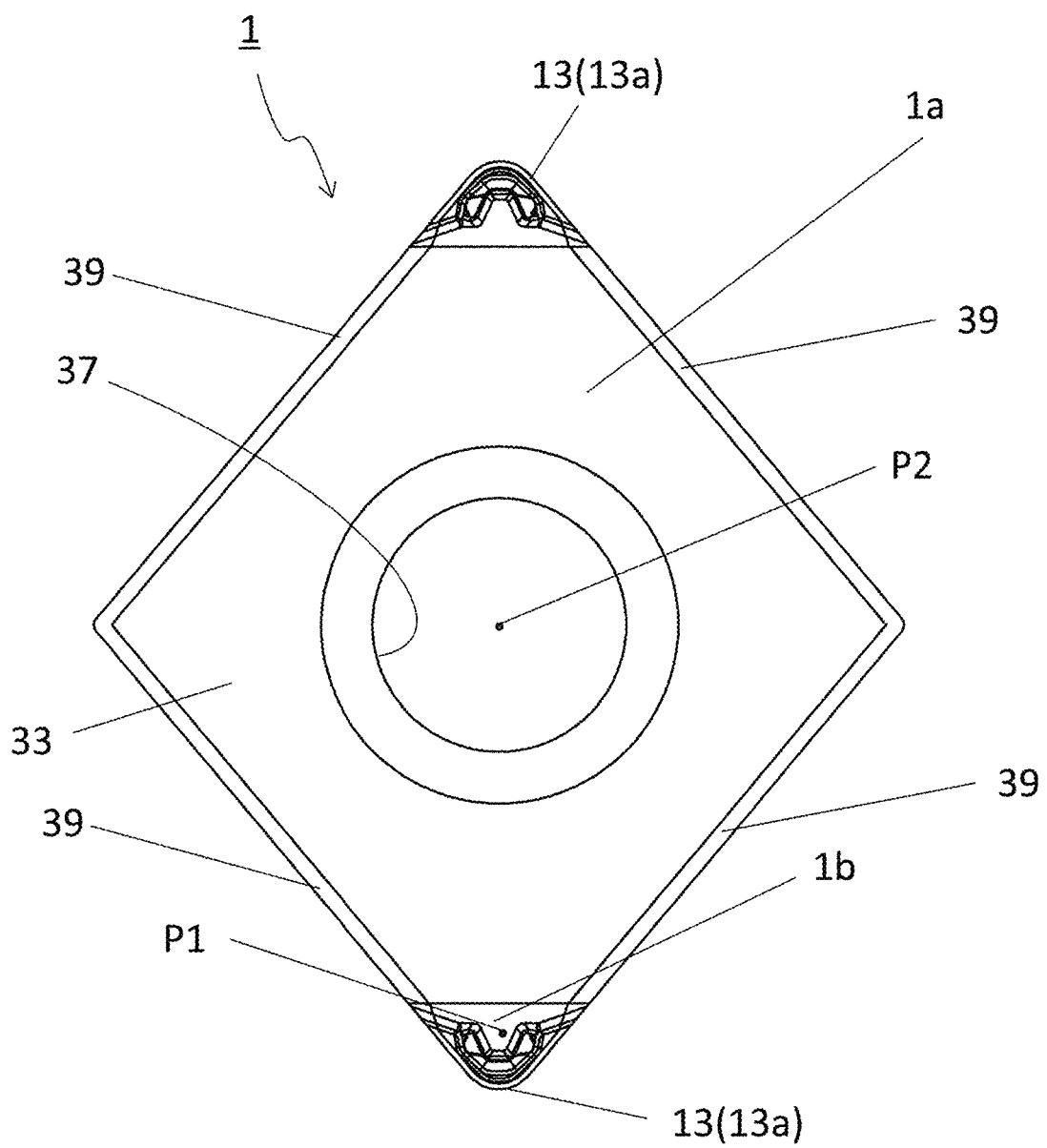
FIG. 14 is a top view of the cutting insert in a non-limiting aspect of the present disclosure.

The inclined surface 13 may include a part whose width in a direction orthogonal to the first side 5 becomes larger as going away from the corner 3 in the front view of the upper surface 7 as illustrated in FIGS. 13 and 14.

If the inclined surface 13 includes the above configuration, it is may be easy to ensure space on the inclined surface 13 which permits passage of chips during the cutting process. The insert 1 may therefore have good chip discharge performance.

The base body 1a may further include a third inclined surface 39 located between the upper end surface 33 and the second lateral surface 36 as illustrated in FIG. 13. The third inclined surface 39 may be inclined relative to the upper end surface 33 and the second lateral surface 36.

Alternatively, the third inclined surface 39 may smoothly connect to the inclined surface 13 without any difference in level between the third inclined surface 39 and the inclined surface 13. For example, the third inclined surface 39 may be located on the same flat surface as the inclined surface 13 as illustrated in FIG. 13. In this case, the insert 1 may be less prone to fracture.

Still alternatively, the whole of the upper end surface 33 may connect through the third inclined surface 39 to the second lateral surface 36 as illustrated in FIG. 14. If the base body 1a includes the above configuration, the insert may be much less prone to fracture.

Examples of material of the cutting part 1b may include cubic boron nitride and diamond. Examples of diamond may include polycrystalline diamond and single crystal diamond (SCD). The cutting part 1b may include one or a plurality of these materials. If the cutting part 1b includes these materials as a main component, the cutting part 1b may include a material other than these materials. As used herein, the term "main component" may denote one which has the largest content ratio in terms of mass ratio.

Examples of material of the base body 1a may include cemented carbide, cermet and ceramics.

Although the insert 1 may be formed only by the base body 1a and the cutting part 1b, the insert 1 may include, in addition to the base body 1a and the cutting part 1b, for example, a coating layer that covers surfaces of these parts. The coating layer may cover a part or the whole of a surface of a base formed by the base body 1a and the cutting part 1b.

Examples of material of the coating layer may include aluminum oxide (alumina) as well as carbides, nitrides, oxides, oxocarbons, nitrogen oxides, carbonitrides and carboxynitrides of titanium. The coating layer may include one or a plurality of the above materials.

The coating layer may be formed by one or a plurality of layers laminated one upon another. The material of the coating layer is not limited to the above materials. The coating layer can be located on the base by using, for example, chemical vapor deposition (CVD) method or physical vapor deposition (PVD) method.

Cutting Tools>

A cutting tool 101 may be described below with reference to the drawings.

Figure 15:
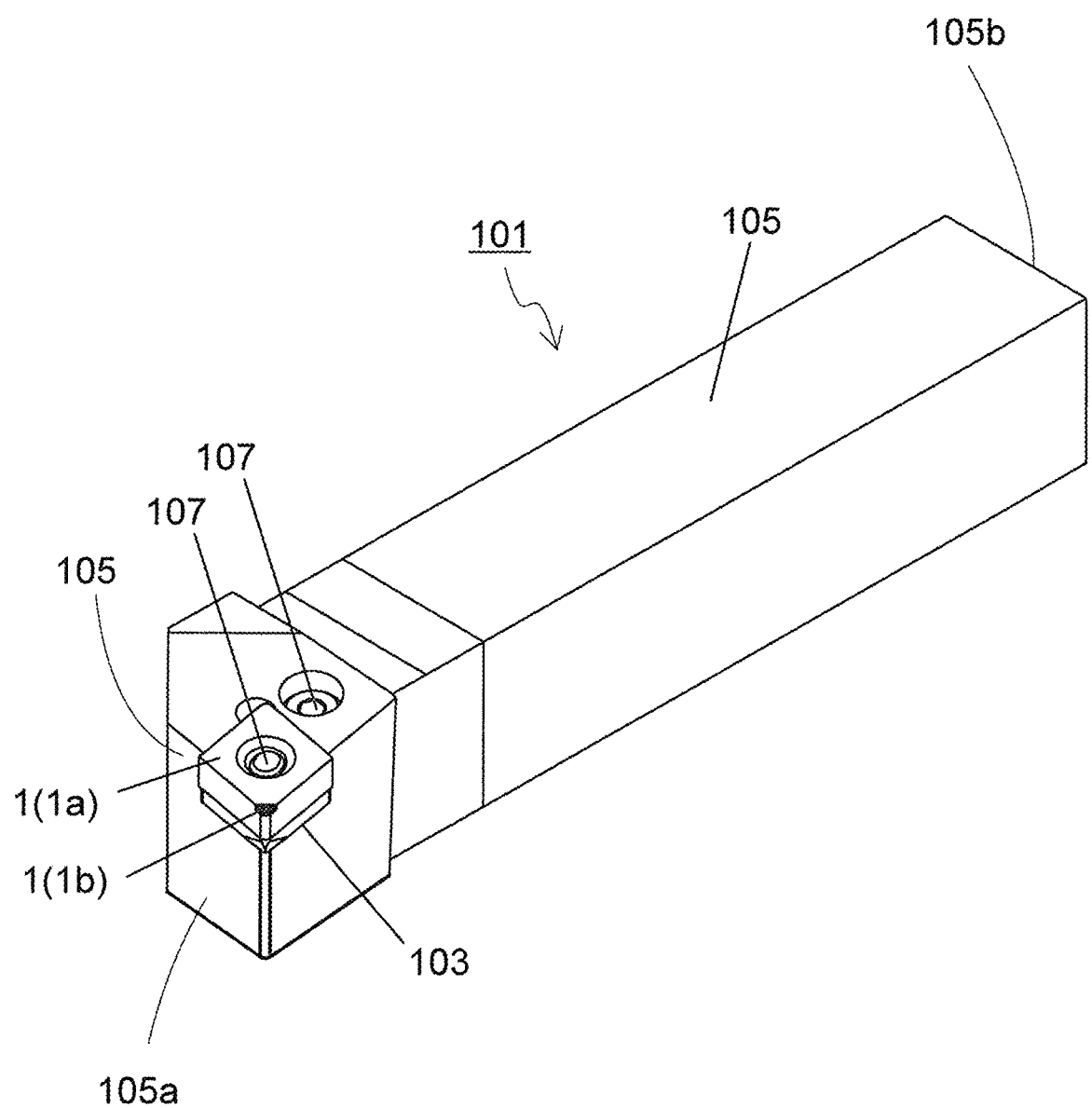
FIG. 15 is a perspective view illustrating a cutting tool in a non-limiting aspect of the present disclosure.

As illustrated in FIG. 15, the cutting tool 101 may include a holder 105 extended from a first end 105a to a second end 105b. The holder 105 may include a pocket 103 (insert pocket) on a side of the first end 105a. The cutting tool 101 may include the insert 1 located in the pocket 103. The insert 1 may be attached in such a manner that at least a part of the second ridgeline which is used as a cutting edge is protruded from the first end 105a of the holder 105 in the cutting tool 101.

The holder 105 may have a bar shape that is narrow and long. The one pocket 103 may be disposed on a side of the first end 105a of the holder 105. The pocket 103 may be a part that permits attachment of the insert 1. The pocket 103 may open into an end surface of the holder 105 which is located on a side of the first end 105a. If the pocket 103 also opens into a lateral surface of the holder 105, it may be easy to attach the insert 1. The pocket 103 may include a seating surface approximately parallel to a lower surface of the holder 105, and a constraining lateral surface inclined relative to the seating surface in one embodiment illustrated in FIG. 15.

The insert 1 may be located in the pocket 103. For example, a lower end surface of the insert 1 may be in direct contact with the pocket 103. Alternatively, a sheet may be interposed between the insert 1 and the pocket 103.

The insert 1 may be attached to the holder 105 by a clamping member 107 as in the embodiment illustrated in FIG. 15. Specifically, the insert 1 may be constrained by the pocket 103 by causing a head of the clamping member 107 to be pressed against an inner wall of the hole of the insert 1.

For example, steel or cast iron may be used as a material of the holder 105. Of these materials, the use of steel particularly may contribute to enhancing toughness of the holder 105.

The cutting tools for use in a so-called turning process may be illustrated in the embodiments. Examples of the turning process may include inner diameter processing, outer diameter processing, end surface processing and grooving process. The cutting tools are not limited to one which is used for the turning process. For example, the insert 1 of the above embodiments may be applied to a cutting tool used for a milling process.

<Method for Manufacturing Machined Product>

A method for manufacturing a machined product in a non-limiting aspect of the present disclosure may be described below with reference to the drawings.

The machined product may be manufacturable by carrying out a cutting process of a workpiece 201. The method for manufacturing the machined product in the embodiments may include the following steps:

(1) rotating the workpiece 201;
(2) bringing the cutting tool 101 represented by the above embodiments into contact with the workpiece 201 being rotated; and
(3) moving the cutting tool 101 away from the workpiece 201.

Figure 16:
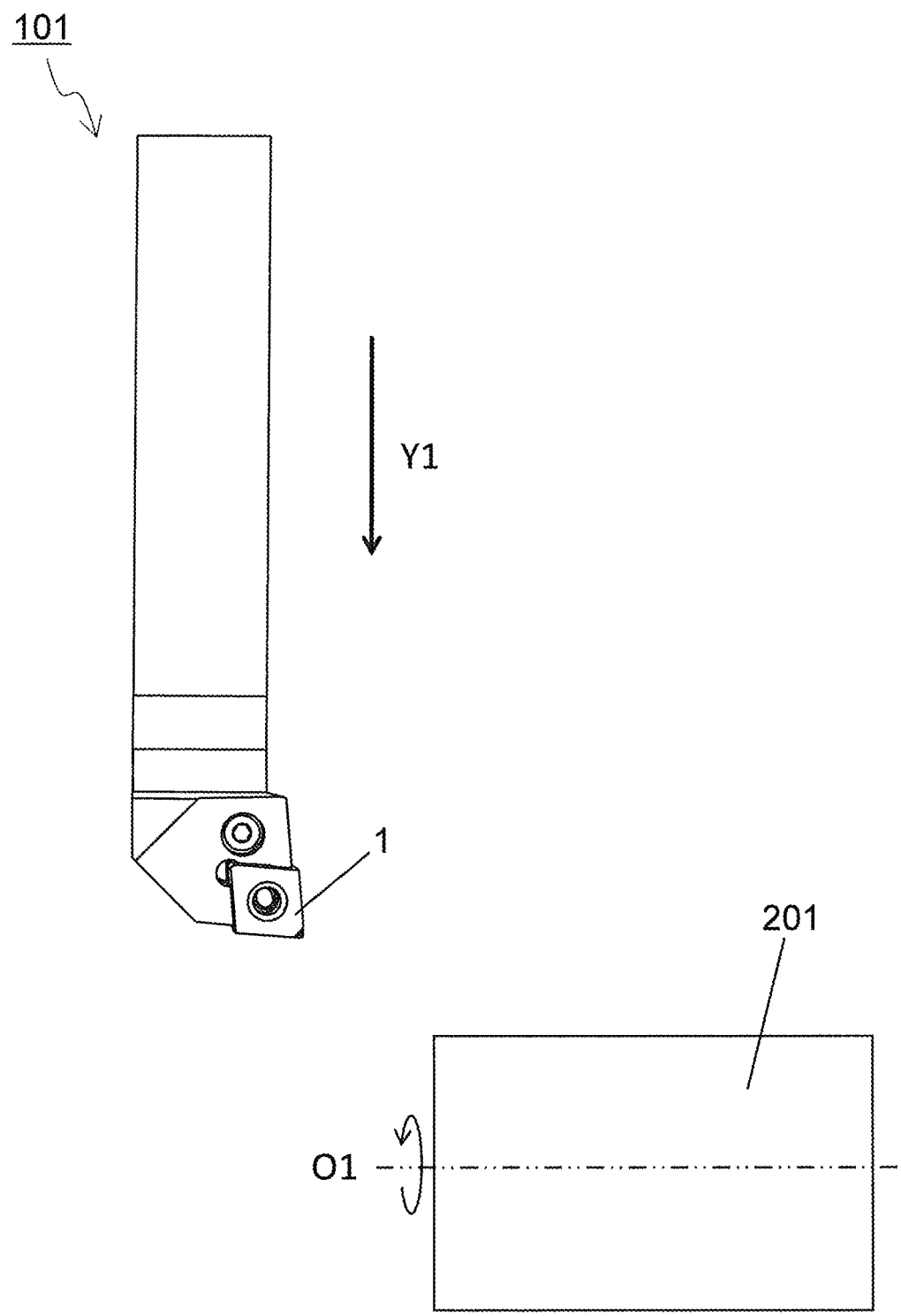
FIG. 16 is a diagram illustrating one of steps in a method for manufacturing a machined product in a non-limiting aspect of the present disclosure.
Figure 17:
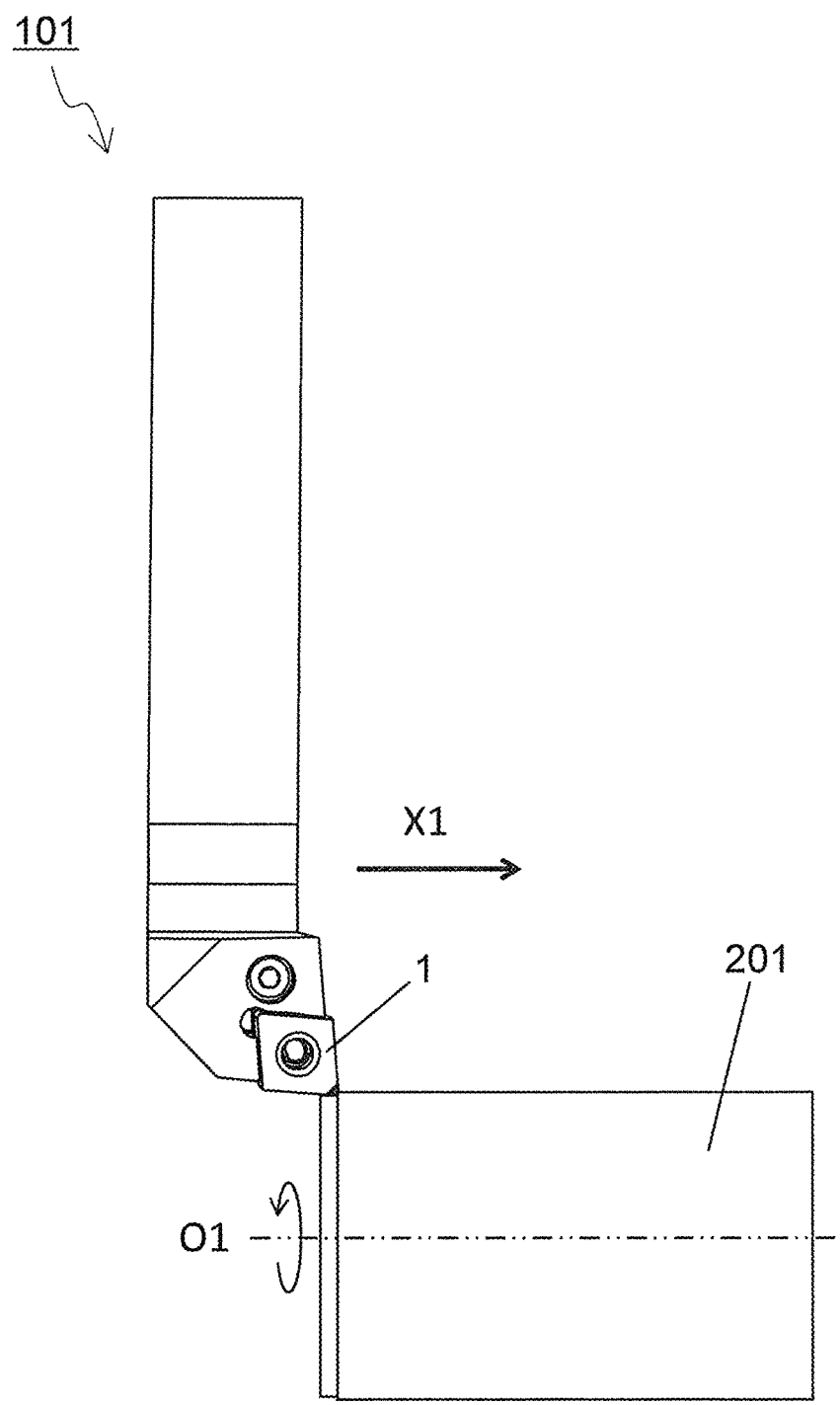
FIG. 17 is a diagram illustrating one of the steps in the method for manufacturing a machined product in the non-limiting aspect of the present disclosure.
Figure 18:
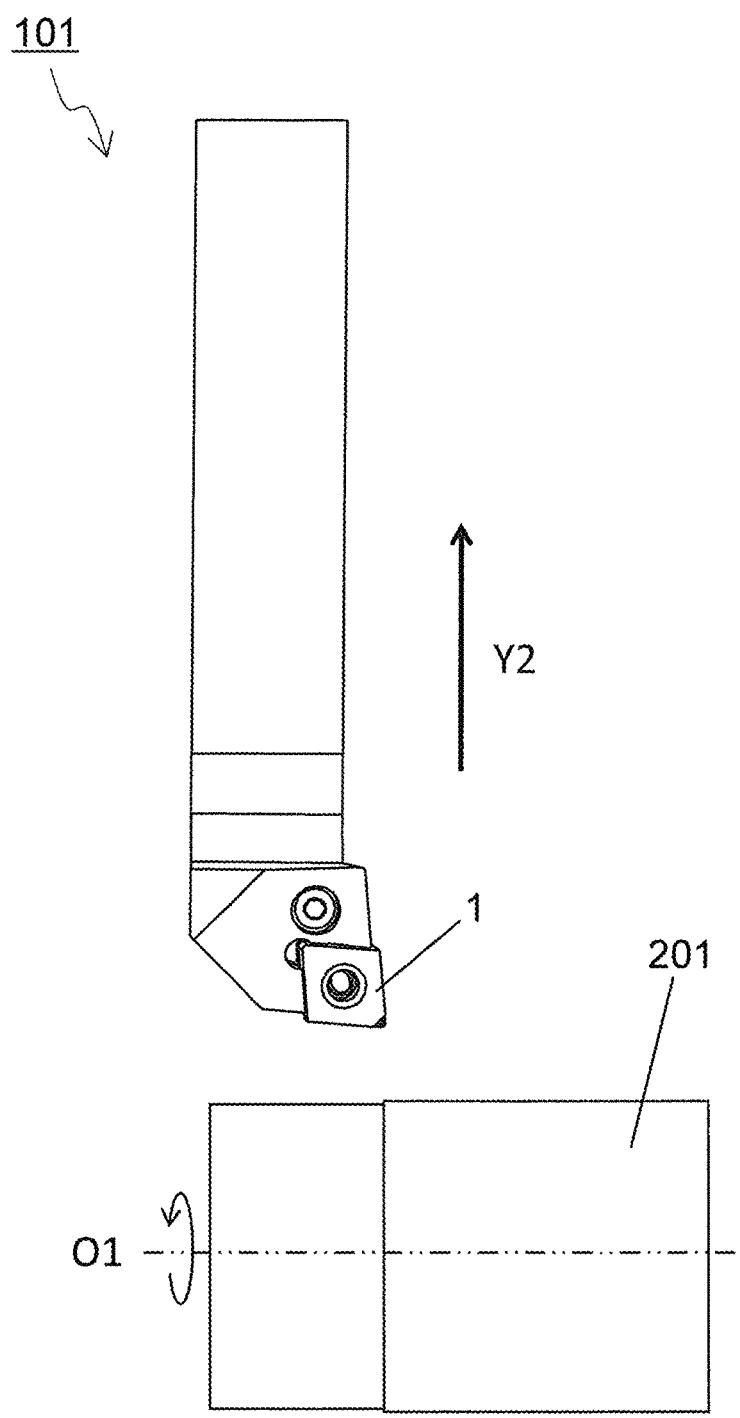
FIG. 18 is a diagram illustrating one of the steps in the method for manufacturing a machined product in the non-limiting aspect of the present disclosure.

More specifically, firstly, the cutting tool 101 may be relatively brought near the workpiece 201 while rotating the workpiece 201 around an axis 01 as illustrated in FIG. 16. The workpiece 201 may be then cut out by bringing at least a part of the cutting edge of the cutting tool 101 into contact with the workpiece 201 as illustrated in FIG. 17. Thereafter, the cutting tool 101 may be relatively moved away from the workpiece 201 as illustrated in FIG. 18.

In the non-limiting embodiment illustrated in FIG. 16, the cutting tool 101 may be brought near the workpiece 201 by moving the cutting tool 101 in a Y1 direction in a state where the axis 01 is fixed and the workpiece 201 is rotated. In the non-limiting embodiment illustrated in FIG. 17, the workpiece 201 may be cut out by bringing at least a part of the corner and the first side in the insert 1 which is used as a cutting edge, into contact with the workpiece 201 being rotated, and by moving the above part in an X1 direction. In the non-limiting embodiment illustrated in FIG. 18, the cutting tool 101 may be moved away from the workpiece 201 by moving the cutting tool 101 in a Y2 direction in a state where the workpiece 201 is rotated.

The cutting tool 101 may be brought into contact with the workpiece 201, or the cutting tool 101 may be moved away from the workpiece 201 by moving the cutting tool 101 in the individual steps. However, it is not intended to limit to this embodiment.

For example, the workpiece 201 may be brought near the cutting tool 101 in the step (1). Similarly, the workpiece 201 may be moved away from the cutting tool 101 in the step (3). If it is desired to continue the cutting process, the step of bringing at least a part of the corner and the first side in the insert 1 which is used as a cutting edge, into contact with different portions of the workpiece 201 may be repeated while keeping the workpiece 201 rotated.

Representative examples of material of the workpiece 201 may include hardened steel, carbon steel, alloy steel, stainless steel, cast iron and nonferrous metals.

The invention claimed is:

1. A cutting insert, comprising:
a first surface comprising a corner and a first line extended from the corner,
a second surface located on a side opposite to the first surface,
a third surface located between the first surface and the second surface,
an inclined surface located between the first surface and the third surface,
a first ridgeline located on an intersection of the inclined surface and the first surface, and
a second ridgeline located on an intersection of the inclined surface and the third surface, wherein
an imaginary straight line passing through a center of the first surface and a center of the second surface is a central axis,
in a cross section which is parallel to the central axis and is orthogonal to the first line in a front view of the first surface,
an imaginary straight line connecting the first ridgeline and the second ridgeline is a first straight line, and
the inclined surface comprises a first inclined surface located more away from the central axis than the first straight line,
the first inclined surface is a curved line in the cross section,
the first inclined surface comprises, in the cross section,
a first portion connecting to the first ridgeline,
a second portion connecting to the second ridgeline, and
a third portion located between the first portion and the second portion,
a radius of curvature of the first portion is a first radius of curvature, a radius of curvature of the second portion is a second radius of curvature, a radius of curvature of the third portion is a third radius of curvature,
the third radius of curvature is larger than each of the first radius of curvature and the second radius of curvature,
a distance between the first ridgeline and an end portion of the first portion which is located on a side of the second surface in a direction along the central axis is a first distance,
a distance between an end portion of the second portion which is located on a side of the first surface and the second ridgeline in the direction along the central axis is a second distance,
a distance between an end portion of the third portion which is located on a side of the first surface and an end portion thereof which is located on a side of the second surface in the direction along the central axis is a third distance,
the third distance is larger than each of the first distance and the second distance, and
the first distance is larger than the second distance.

2. The cutting insert according to claim 1, wherein the first radius of curvature is larger than the second radius of curvature.

3. The cutting insert according to claim 1, wherein, in a cross section which intersects with the first inclined surface and is orthogonal to the central axis, the first inclined surface comprises
a first convex curved line,
a second convex curved line located adjacent to the first convex curved line, and
a third convex curved line located adjacent to the second convex curved line, and
a distance between a top portion of the first convex curved line and a top portion of the second convex curved line is equal to a distance between the top portion of the second convex curved line and a top portion of the third convex curved line.

4. The cutting insert according to claim 1, wherein
the inclined surface further comprises a second inclined surface located more away from the corner than the first inclined surface, and
in a cross section which is parallel to the central axis, and which is orthogonal to the first line and passes through the second inclined surface in a front view of the first surface, the second inclined surface is located closer to the central axis than the first straight line.

5. The cutting insert according to claim 1, wherein the inclined surface comprises a part whose width in a direction orthogonal to the first line becomes larger as going away from the corner in a front view of the first surface.

6. A cutting tool, comprising:
a holder comprising a pocket located on a side of a front end of the holder; and
the cutting insert according to claim 1, the cutting insert being located in the pocket.

7. A method for manufacturing a machined product, the method comprising:
rotating a workpiece;
bringing the cutting tool according to claim 6 into contact with the workpiece being rotated; and
moving the cutting tool away from the workpiece.

8. A cutting insert, comprising:
a first surface comprising a corner and a first line extended from the corner,
a second surface located on a side opposite to the first surface,
a third surface located between the first surface and the second surface,
an inclined surface located between the first surface and the third surface,
a first ridgeline located on an intersection of the inclined surface and the first surface, and
a second ridgeline located on an intersection of the inclined surface and the third surface, wherein
an imaginary straight line passing through a center of the first surface and a center of the second surface is a central axis,
in a cross section which is parallel to the central axis and is orthogonal to the first line in a front view of the first surface,
an imaginary straight line connecting the first ridgeline and the second ridgeline is a first straight line, and
the inclined surface comprises a first inclined surface located more away from the central axis than the first straight line,
the first inclined surface comprises, in the cross section,
a first portion connecting to the first ridgeline,
a second portion connecting to the second ridgeline, and
a third portion located between the first portion and the second portion,
a distance between the first ridgeline and an end portion of the first portion which is located on a side of the second surface in a direction along the central axis is a first distance,
a distance between an end portion of the second portion which is located on a side of the first surface and the second ridgeline in the direction along the central axis is a second distance,
a distance between an end portion of the third portion which is located on a side of the first surface and an end portion thereof which is located on a side of the second surface in the direction along the central axis is a third distance, the third distance is larger than each of the first distance and the second distance, and
the first distance is larger than the second distance.

9. The cutting insert according to claim 8, wherein, in a cross section which intersects with the first inclined surface and is orthogonal to the central axis, the first inclined surface comprises
a first convex curved line,
a second convex curved line located adjacent to the first convex curved line, and
a third convex curved line located adjacent to the second convex curved line, and
a distance between a top portion of the first convex curved line and a top portion of the second convex curved line is equal to a distance between the top portion of the second convex curved line and a top portion of the third convex curved line.

10. The cutting insert according to claim 8, wherein
the inclined surface further comprises a second inclined surface located more away from the corner than the first inclined surface, and
in a cross section which is parallel to the central axis, and which is orthogonal to the first line and passes through the second inclined surface in a front view of the first surface, the second inclined surface is located closer to the central axis than the first straight line.

11. The cutting insert according to claim 8, wherein the inclined surface comprises a part whose width in a direction orthogonal to the first line becomes larger as going away from the corner in a front view of the first surface.

12. A cutting insert, comprising:
a first surface comprising a corner and a first line extended from the corner,
a second surface located on a side opposite to the first surface,
a third surface located between the first surface and the second surface,
an inclined surface located between the first surface and the third surface,
a first ridgeline located on an intersection of the inclined surface and the first surface, and
a second ridgeline located on an intersection of the inclined surface and the third surface, wherein
an imaginary straight line passing through a center of the first surface and a center of the second surface is a central axis,
in a cross section which is parallel to the central axis and is orthogonal to the first line in a front view of the first surface,
an imaginary straight line connecting the first ridgeline and the second ridgeline is a first straight line, and
the inclined surface comprises a first inclined surface located more away from the central axis than the first straight line,
in a cross section which intersects with the first inclined surface and is orthogonal to the central axis, the first inclined surface comprises
a first convex curved line,
a second convex curved line located adjacent to the first convex curved line, and
a third convex curved line located adjacent to the second convex curved line, and
a distance between a top portion of the first convex curved line and a top portion of the second convex curved line is equal to a distance between the top portion of the second convex curved line and a top portion of the third convex curved line.

13. The cutting insert according to claim 12, wherein
the inclined surface further comprises a second inclined surface located more away from the corner than the first inclined surface, and
in a cross section which is parallel to the central axis, and which is orthogonal to the first line and passes through the second inclined surface in a front view of the first surface, the second inclined surface is located closer to the central axis than the first straight line.

14. The cutting insert according to claim 12, wherein the inclined surface comprises a part whose width in a direction orthogonal to the first line becomes larger as going away from the corner in a front view of the first surface.

15. A cutting insert, comprising:
a first surface comprising a corner and a first line extended from the corner,
a second surface located on a side opposite to the first surface,
a third surface located between the first surface and the second surface,
an inclined surface located between the first surface and the third surface,
a first ridgeline located on an intersection of the inclined surface and the first surface, and
a second ridgeline located on an intersection of the inclined surface and the third surface, wherein
an imaginary straight line passing through a center of the first surface and a center of the second surface is a central axis,
in a cross section which is parallel to the central axis and is orthogonal to the first line in a front view of the first surface,
an imaginary straight line connecting the first ridgeline and the second ridgeline is a first straight line, and
the inclined surface comprises a first inclined surface located more away from the central axis than the first straight line,
the inclined surface further comprises a second inclined surface located more away from the corner than the first inclined surface, and
in a cross section which is parallel to the central axis, and which is orthogonal to the first line and passes through the second inclined surface in a front view of the first surface, the second inclined surface is located closer to the central axis than the first straight line.

16. The cutting insert according to claim 15, wherein the inclined surface comprises a part whose width in a direction orthogonal to the first line becomes larger as going away from the corner in a front view of the first surface.

17. A cutting insert, comprising:
a first surface comprising a corner and a first line extended from the corner,
a second surface located on a side opposite to the first surface,
a third surface located between the first surface and the second surface,
an inclined surface located between the first surface and the third surface,
a first ridgeline located on an intersection of the inclined surface and the first surface, and
a second ridgeline located on an intersection of the inclined surface and the third surface, wherein
an imaginary straight line passing through a center of the first surface and a center of the second surface is a central axis,
in a cross section which is parallel to the central axis and is orthogonal to the first line in a front view of the first surface,
an imaginary straight line connecting the first ridgeline and the second ridgeline is a first straight line, and
the inclined surface comprises a first inclined surface located more away from the central axis than the first straight line, and
the inclined surface comprises a part whose width in a direction orthogonal to the first line becomes larger as going away from the corner in a front view of the first surface.

* * * * *